United States Patent [19]

Cho

[11] Patent Number: 4,787,718

[45] Date of Patent: Nov. 29, 1988

[54] ZOOM LENS SYSTEM

[75] Inventor: Michio Cho, Tokyo, Japan

[73] Assignee: Fuji Photo Film Co., Ltd., Kanagawa, Japan

[21] Appl. No.: 34,144

[22] Filed: Apr. 7, 1987

[30] Foreign Application Priority Data

Apr. 7, 1986 [JP] Japan .................................. 61-78397

[51] Int. Cl.$^4$ ..................... G02B 15/14; G02B 15/177
[52] U.S. Cl. ...................................... 350/427; 350/423
[58] Field of Search ...................... 350/423, 426, 427

[56] References Cited

U.S. PATENT DOCUMENTS

| | | | |
|---|---|---|---|
| 4,406,523 | 9/1983 | Sato et al. | 350/426 |
| 4,469,412 | 9/1984 | Tajima et al. | 350/426 |
| 4,477,153 | 10/1984 | Suda et al. | 350/426 |
| 4,636,040 | 1/1987 | Tokumaru | 350/426 X |

Primary Examiner—John K. Corbin
Assistant Examiner—Scott J. Sugarman
Attorney, Agent, or Firm—Young & Thompson

[57] ABSTRACT

A zoom lens system for use in a compact camera with a lens shutter, having a zooming ratio about X2 and comprising a front lens group including a first lens group having a negative refraction power, a second and a third lens group, each having a positive refraction power, and a rear lens group including a fourth lens group having a negative refraction power. The front and rear lens groups are axially moved to change the distance therebetween and the second lens group is moved toward and away from the first lens group during the zooming operation. Numerical data are given for certain design features of the lens components which comprise the first to fourth lens groups, so that better correction of aberrations is attained.

8 Claims, 6 Drawing Sheets

WIDE ANGLE

TELEPHOTO f = 68.00
F : 5.26

SPHERICAL ABERRATION  ASTIGMATISM  DISTORTION f = 36.00
F : 2.88

SPHERICAL ABERRATION  ASTIGMATISM  DISTORTION f=50.00
F:4

SPHERICAL ABERRATION
ASTIGMATISM
DISTORTION f=68.00
F:5.44

SPHERICAL ABERRATION
ASTIGMATISM
DISTORTION

ZOOM LENS SYSTEM

BACKGROUND OF THE INVENTION

The present invention relates to a zoom lens system for use in a compact camera with a lens shutter and, more particularly, to a compact zoom lens system in which the distance from the first lens surface to the image-forming plane is relatively short.

In the field of compact still cameras with lens shutters, a bifocal-type compact camera which is available for both wide-angle photography and telephotography as recently been introduced. The bifocal-type compact camera is provided either with two interchangeable lens systems or with a lens system having a conversion lens component to be moved into and out of the optical train.

Against this background, the demand for a compact camera with a zoom lens system as the taking lens system has recently increased.

There are already well known a number of kinds of zoom lens systems, which, however, are for use in single lens reflex cameras. Therefore, these zoom lens systems must have a back focal distance longer than 35 mm in order to provide the necessary space in the single lens reflex camera for allowing a so-called quick-return mirror to swing up and down; and so the length from the first lens surface to the image forming or focal plane is relatively long. For these reasons, a zoom lens system is disadvantageous when the camera must be as small as possible. Therefore, a compact camera equipped with a conventional zoom lens system would not be convenient to carry. Convenience of carrying is one of the most important advantages of a compact camera and should by no means be disregarded.

In order to overcome the difficulty with which zoom lens systems are attended, various zoom lens systems have been proposed. Among these is a zoom lens system disclosed in Japanese Patent Kokai (Unexamined Publication) No. 56-128,911, which includes a first positive refractive power lens group and a second negative refractive power lens group which are adapted to move relatively in order to vary the distance therebetween, thereby to vary the focal length thereof for zooming. This zoom lens system, while being sufficiently short in overall length when adjusted for wide-angle photography, is limited to a zooming ratio of approximately 1.5, which is poor in comparison with that of a bifocal-type compact camera.

Another zoom lens system, disclosed in Japanese Patent Kokai (Unexamined Publication) No. 58-184,916, comprises a first and a second positive refraction power lens group, and a third negative refraction power lens group, and has a zooming ratio comparable to that of a bifocal-type compact camera, a sufficiently shortened overall length and a desirable optical performance. However, this zoom lens system is not practical, because of its very short back focal distance of a little over 1 mm for wide-angle photography. Additionally, since the zoom lens system has a constant aperture ratio of F/4.5 over the whole range of zooming, it is necessary to vary the size of the aperture according to the focal length. This requirement makes it difficult or even impossible to incorporate the zoom lens system in a compact camera with aperture-shutter means. If it is assumed that the size of the aperture is maintained constant over the whole range of zooming, the aperture ratio will be approximately F/8.7 at the telephotographic extremity of the zooming range, which is to slow in lens speed for the zoom lens system to be incorporated in still cameras.

In the zoom lens system disclosed in the last-mentioned Japanese Patent Kokai, it is necessary to move axially aperture means simultaneously with the axial movement of the lens groups in order to focus. Due to the necessity of moving the aperture means, it is very difficult to incorporate the zoom lens system in an automatic focusing camera.

In the zoom lens systems described above which comprise two lens groups, if there is a demand for magnification, say, 2X, it will become very difficult to correct the chromatic aberration over the whole range of zooming because of the concave lens component involved in the rear lens group, which acts differently on both longitudinal and lateral chromatic aberrations.

OBJECTS OF THE INVENTION

It is therefore an object of the present invention to provide a zoom lens system suitable for use in a compact camera with a lens shutter.

It is another object of the present invention to provide a zoom lens system which, while having a zooming ratio about 2X and a back focal distance which is neither too long nor too short, is short in overall length.

It is still another object of the present invention to provide a zoom lens system which has a fast lens speed between approximately F/5.6 and F/6 for telephotography and in which no movement is caused in the aperture means by the zooming operation.

SUMMARY OF THE INVENTION

According to the present invention, the zoom lens system comprises, in order from the object side, a first lens group having a negative refraction power, a second lens group having a positive refraction power, a third lens group having a positive refraction power, and a fourth lens group having a negative refraction power, these lens groups being further divided into two generic groups, namely, the first generic or front lens group including the first to third lens groups and the second generic or rear lens group including the fourth lens group. The zoom lens system is so constructed as to cause a relative axial movement between the front and rear lens groups to vary the distance therebetween, while simultaneously causing an axial movement of the second lens group between the first and third lens groups. Specifically, when the zoom lens system is adjusted for telephotography, that is to say, the focal length of the zoom lens system is lengthened, the front and rear lens groups are relatively axially moved by the zooming operation to decrease the distance therebetween and the second lens group is moved axially toward the first lens group.

In accordance with a feature of the zoom lens system of a preferred embodiment of the present invention, the fluctuation of lateral chromatic aberration caused by the relative movement of the front and rear lens groups of the zoom lens system accompanying the zooming operation is corrected by the axial movement of the second lens group. Consequently, the chromatic aberration can be substantially uniformly corrected over the whole range of zooming.

Since the first lens group of the zoom lens system has a negative refraction power, the zoom lens system avoids having an extremely short back focal distance.

Although the number of lens groups is increased relative to the above-mentioned zoom lens systems, nevertheless the zoom lens system cannot only comprise a reduced number of lens components but also have a large aperture ratio, resulting in satisfactory optical performance. Since the zoom lens system is also so constructed as to maintain the overall length of the front lens group constant over the whole range of zooming, the zoom lens system, while comprising four lens groups, allows reducing the number of cams for causing the axial movement of the movable lens groups, to the number in three-lens-group zoom lens systems.

Figure 1A:
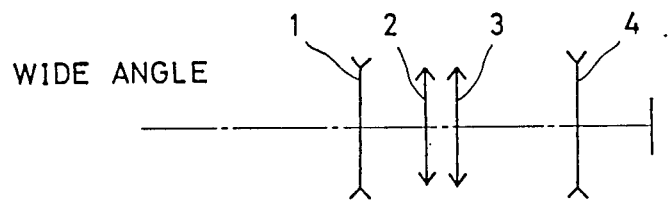
FIG. 1A illustrates diagrammatically the zoom lens system of the present invention, in the wide-angle position.

In the drawings, it is arbitrarily assumed that the incident light travels from left to right.

DETAILED DESCRIPTION OF THE INVENTION

Figure 1B:
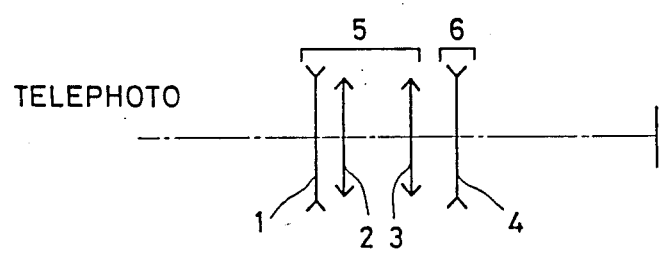
FIG. 1B is a view similar to FIG. 1A but showing the telephoto position.

Referring now to FIGS. 1A and 2B conceptually showing the principles of construction of the zoom lens system according to the present invention, the zoom lens system comprises, in order from the object side, that is from left to right in the drawings, a first lens group 1 having a negative refraction power, second and third lens groups 2 and 3, each having a positive refraction power, and a fourth lens group 4 having a positive refraction power, which are divided into two generic groups. One of these two groups is a front lens group 5 including the first to third lens groups and the remaining group is a rear lens group 6 including the fourth lens group. When the zoom lens system, which has previously been adjusted for wide-angle photography as shown in FIG. 1A, is adjusted for telephotography as shown in FIG. 1B, the front and rear lens groups 5 and 6 are relatively axially moved to decrease the distance therebetween and simultaneously, the second lens group 2 is toward the first lens group 1.

In the zoom lens system, the individual lens groups 1 to 4 preferably satisfy the following conditions:

$$|\phi_1| < |\phi_4| \quad (1)$$

$$|\phi_2| < |\phi_3| \quad (2)$$

wherein the reference symbols $\phi_1$, $\phi_2$, $\phi_3$, and $\phi_4$ represent the refraction powers of the lens groups 1 to 4, respectively.

If in fact the conditions (1) and (2) are satisfied, each lens group (1), (2), (3), (4) has a refraction power which will not be undesirably great, thereby obtaining a desirable back focal distance. On the other hand, if either one of the conditions (1) and (2) is not satisfied, the refraction power of each lens group (1), (2), (3), and (4) becomes altogether too great, resulting in great difficulty in correcting various kinds of aberrations.

In order to enable focusing without any axial movement of the aperture means disposed between the lens groups, it is preferred to provide the first lens group with a positive power lens component and a negative power biconcave lens component arranged in this order from the object side, and to make the positive power lens component movable. According to this lens arrangement, since there is no axial movement of the aperture means and an increased amount of axial movement of the focusing lens components, the zoom lens system can be adjusted to focus an image with greatly improved accuracy. In order to minimize the fluctuation of the aberrations caused by the focusing operation, it is preferred to use, as the positive power lens component, a lens, similar to a plano-convex lens, having a convex object side surface whose radius of curvature is small.

For further improving the optical performance of the zoom lens system according to the present invention, it is preferred to provide in the second lens group 2 either at least one cemented lens or at least a pair of concave and convex surfaces extremely close to each other, thereby to maintain a proper petzval's sum which is apt to increase on the negative side and to control the fluctuation of the chromatic aberrations. It should be noted that, in order to augment the effect of the aberration correction, the concave and convex lenses either cemented or closely arranged should be made of glass satisfying the following conditions:

$$0.1 < N_- - N_+ < 0.35 \quad (3)$$

$$\nu_- < \nu_+ \quad (4)$$

wherein the reference symbols $N_-$ and $N_+$ represent the refractive indices and the reference symbols $\nu_-$ and $\nu_+$ represent the Abbe numbers, of glass materials for the concave and convex lenses to be cemented or closely arranged, respectively.

In the case of the value of $N_- - N_+$ smaller than the lower limit of the inequality condition (3), the correction of the petzval's sum will be effected insufficiently and the radius of curvature of the surface of each lens to be cemented or closely arranged will become excessively large. Additionally, spherical aberrations of high orders will be produced.

On the other hand, in the case of the value of $N_- - N_+$ being larger than the upper limit of the condition (3), the refractive index of the concave lens is excessively high, while the correction of the petzval's sum will be effected sufficiently. In the case of the inequality condition (4) being unsatisfied, the fluctuation of the aberrations caused by the zooming operation cannot be controlled.

Preferred embodiments of the zoom lens system for use in compact cameras according to the present invention are shown in FIGS. 2 to 9 and described below.

Tables I to IV hereinafter show first to fourth embodiments corresponding to FIGS. 2, 4, 6 and 8, respectively. FIGS. 3, 5, 7 and 9 show the aberration curves of the first to fourth embodiments at three specific focal lengths; 36.01 mm, 50.00 mm, and 68.02 mm for the first embodiment, and 36.00 mm, 50.00 mm, and 68.00 mm for the second to fourth embodiments. In each of Tables I, II, III, IV, the numerical data are indicated by reference symbols; namely the radii of curvature of the lens surfaces by R, the axial thicknesses and distances by d, the refractive indices for the spectral d-line by N and the Abbe numbers of the glasses by $\nu$, which are all expressed with a subscript numbered consecutively from the object side to the focal plane side. In the graphs shown in FIGS. 3, 5, 7 and 9, the reference symbols, d, g, S.C, $\Delta M$, $\Delta S$, and Y indicate respectively the spherical aberration curves for the spectral d- and g-lines, the sign condition curves, the astigmatism curves on the meridinal and sagittal planes, and the height of image to a maximum of 21.63 mm.

Embodiment I

Figure 2:
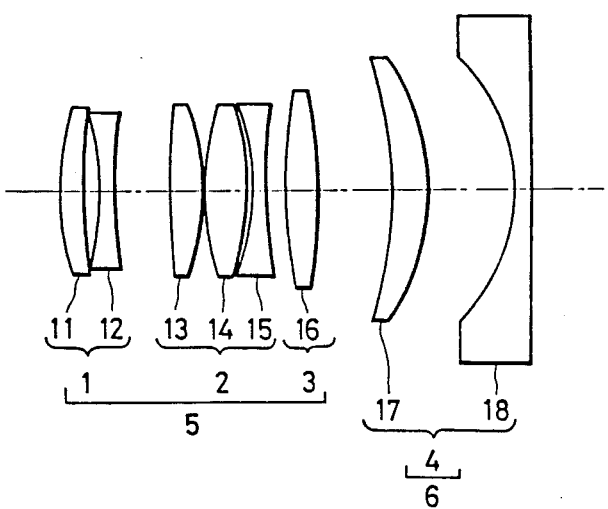
FIG. 2 shows in greater detail a first embodiment of a zoom lens system of the present invention.

In the first embodiment of the present invention shown in FIG. 2 and defined in Table I, the zoom lens system is so constructed as to vary, from wide-angle photography to telephotography, in focal length f from 36.01 to 68.02 mm, the aperture ratio of F No. between 1:2.88 and 1:5.26, and the angle of view $\omega$ between 61.98° and 35.29°. The zoom lens system, as it is described above, comprises the front lens group 5 comprising first to third lens groups 1 to 3 and the rear lens group 6 comprising fourth lens group 4, all of which correspond to the lens groups shown in FIG. 1. Specifically, there are arranged in the zoom lens system, lens components 11 and 12 of the first lens group 1, lens components 13 to 15 of the second lens group 2, a lens component 16 comprising the third lens group 3, and the remaining two lens components 17 and 18 of the fourth lens group 4, in that order from the object side.

During the zooming operation for telephotography, axial relative movement is caused between the front and rear lens groups 5 and 6 so as to decrease the distance therebetween simultaneously with the axial movement of the second lens group 2 toward the first lens group 1, thereby to vary the focal length or the ratio of zooming.

TABLE I $f = 36.01 \sim 68.02$ mm  F No. $= 1:2.88 \sim 1:5.26$  $\omega = 35.28° \sim 61.98°$

| | | | |
|---|---|---|---|
| $R_1 = 23.113$ mm | | | |
| | $d_1 = 2.23$ mm | $N_1 = 1.68893$ | $\nu_1 = 31.2$ |
| $R_2 = 58.866$ | | | |
| | $d_2 = 1.41$ | | |
| $R_3 = -24.831$ | | | |
| | $d_3 = 1.30$ | $N_2 = 1.7725$ | $\nu_2 = 49.6$ |
| $R_4 = 50.218$ | | | |
| | $d_4$ VARIABLE | | |
| $R_5 = 69.328$ | | | |
| | $d_5 = 3.33$ | $N_3 = 1.5168$ | $\nu_3 = 64.2$ |
| $R_6 = -19.361$ | | | |
| | $d_6 = 0.10$ | | |
| $R_7 = 27.377$ | | | |
| | $d_7 = 3.52$ | $N_4 = 1.5168$ | $\nu_4 = 64.2$ |
| $R_8 = -23.292$ | | | |
| | $d_8 = 0.53$ | | |
| $R_9 = -20.567$ | | | |
| | $d_9 = 1.30$ | $N_5 = 1.80518$ | $\nu_5 = 25.5$ |
| $R_{10} = 42.058$ | | | |
| | $d_{10}$ VARIABLE | | |
| $R_{11} = 48.902$ | | | |
| | $d_{11} = 2.79$ | $N_6 = 1.80518$ | $\nu_6 = 25.2$ |
| $R_{12} = -51.243$ | | | |

TABLE I-continued $f = 36.01 \sim 68.02$ mm  F No. $= 1:2.88 \sim 1:5.26$  $\omega = 35.28° \sim 61.98°$

| | | | |
|---|---|---|---|
| | $d_{12}$ VARIABLE | | |
| $R_{13} = -37.803$ | | | |
| | $d_{13} = 2.90$ | $N_7 = 1.72342$ | $\nu_7 = 38.0$ |
| $R_{14} = -22.682$ | | | |
| | $d_{14} = 7.97$ | | |
| $R_{15} = -16.009$ | | | |
| | $d_{15} = 1.50$ | $N_8 = 1.6935$ | $\nu_8 = 53.3$ |
| $R_{16} = -629.690$ | | | |

The variable distances $d_4$, $d_{10}$ and $d_{12}$ indicated in Table I are given for the specific focal lengths f in the folllowing table wherein Bf represents the back focal distance for the focal length f.

Variable Distance

| f | $d_4$ | $d_{10}$ | $d_{12}$ | Bf |
|---|---|---|---|---|
| 36.01 mm | 6.40 mm | 0.10 mm | 13.96 mm | 7.09 mm |
| 50.00 | 4.80 | 1.70 | 6.72 | 20.82 |
| 68.02 | 3.50 | 3.00 | 1.55 | 38.01 |

Figure 3A:
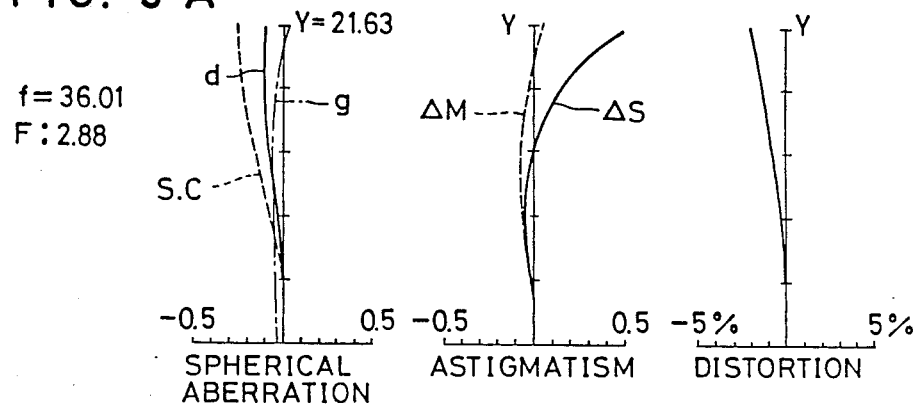
FIGS. 3A, 3B and 3C are graphs of spherical aberration, astigmatism and distortion, for lens systems as in FIG. 2 for respectively three different sets of focal length and F ratio.
Figure 3B:
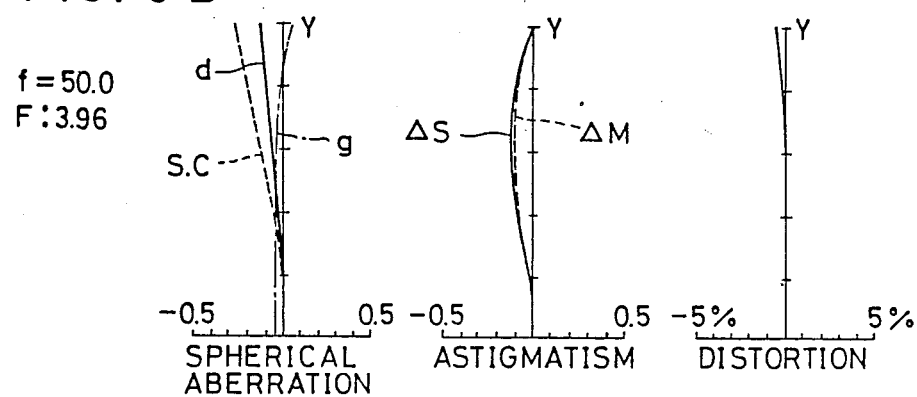
Figure 3C:
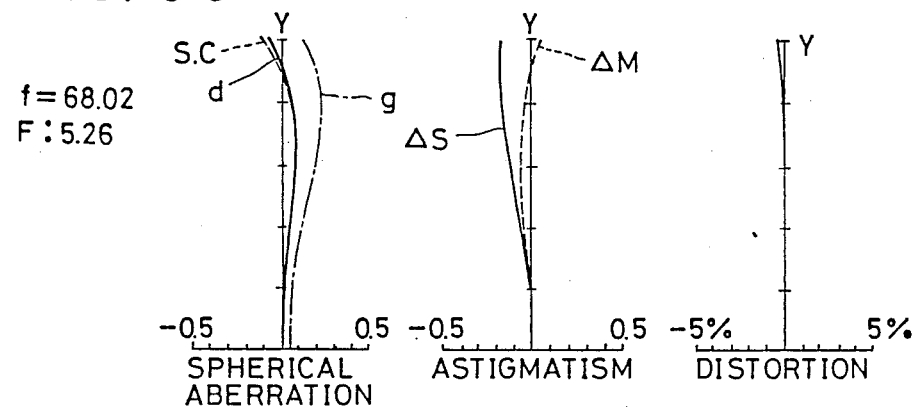

FIGS. 3A, 3B and 3C correspond to the specific focal lengths tabulated above, namely 36.01 mm, 50.00 mm and 68.02 mm, respectively.

Embodiment II

Figure 4:
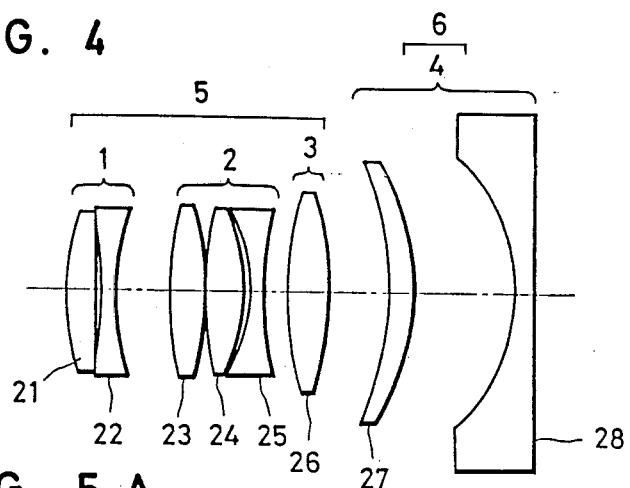
FIG. 4 is a view similar to FIG. 2 but showing a second embodiment thereof.
Figure 5A:
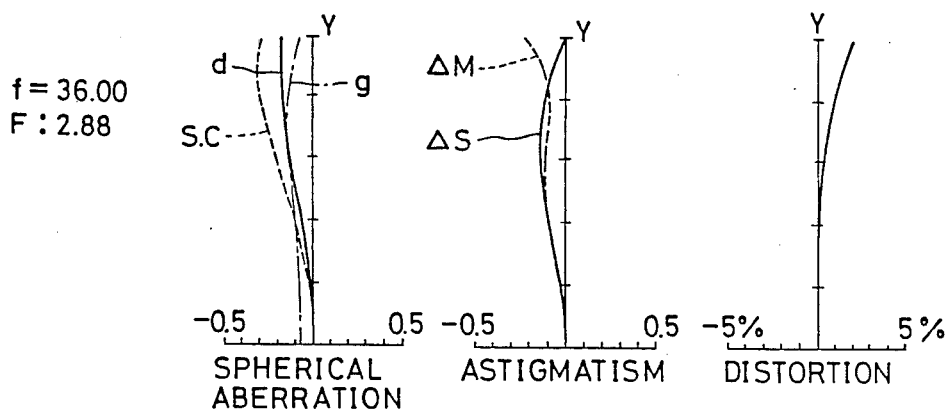
FIGS. 5A, 5B and 5C are views similar to FIGS. 3A–3C but pertaining to the embodiment of FIG. 4.
Figure 5B:
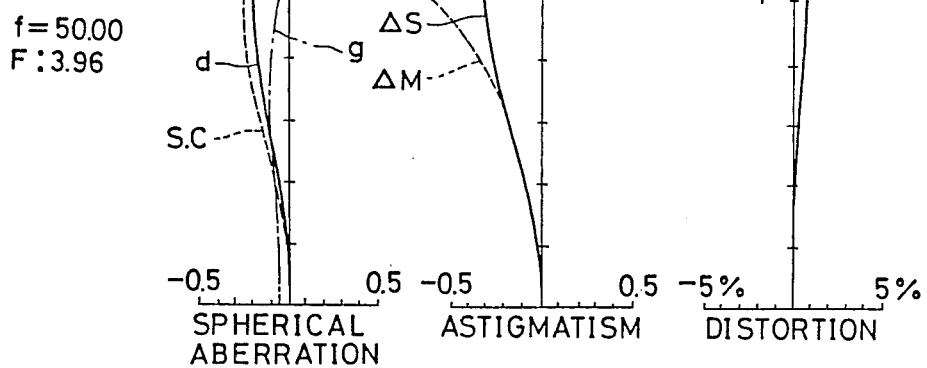
Figure 5C:
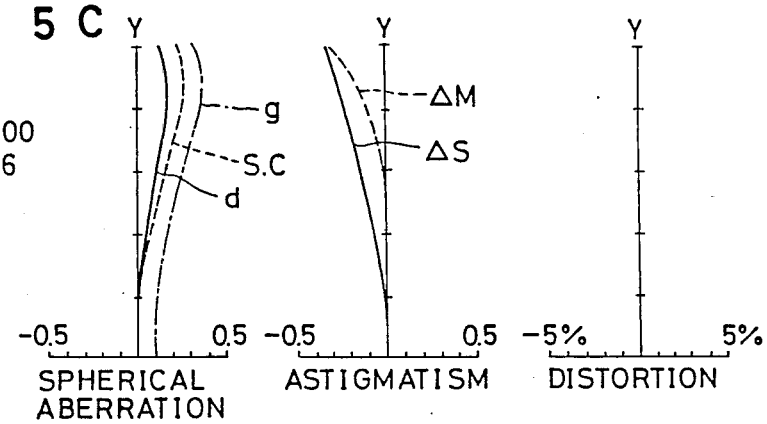

In the second embodiment of the present invention shown in FIG. 4 and defined in Table II, the zoom lens system is so constructed as to vary in focal length f between 36.00 and 68.00 mm, the aperture ratio or F No. between 1:2.88 at the wide-angle photographic extremity and 1:5.26 at the telephotographic extremity, and the angle of view $\omega$ between 62.0° at the wide-angle photographic extremity and 35.30° at the telephotographic extremity. The zoom lens system has lens components 21 to 28 arranged in the same order as in the zoom lens system of FIG. 2 but having numerical data different from those of the zoom lens system of FIG. 2.

TABLE II $f = 36.00 \sim 68.00$ mm  F No. $= 1:2.88 \sim 1:5.26$  $\omega = 62.0° \sim 35.30°$

| | | | |
|---|---|---|---|
| $R_1 = 21.444$ mm | | | |
| | $d_1 = 2.57$ mm | $N_1 = 1.62004$ | $\nu_1 = 36.3$ |
| $R_2 = -1320.780$ | | | |
| | $d_2 = 0.67$ | | |
| $R_3 = -30.138$ | | | |
| | $d_3 = 1.3$ | $N_2 = 1.7725$ | $\nu_2 = 49.6$ |
| $R_4 = 23.632$ | | | |
| | $d_4$ VARIABLE | | |
| $R_5 = 32.280$ | | | |
| | $d_5 = 3.21$ | $N_3 = 1.58913$ | $\nu_3 = 61.3$ |
| $R_6 = -27.085$ | | | |
| | $d_6 = 0.1$ | | |
| $R_7 = 41.929$ | | | |
| | $d_7 = 3.44$ | $N_4 = 1.62004$ | $\nu_4 = 36.4$ |
| $R_8 = -17.057$ | | | |
| | $d_8 = 0.19$ | | |
| $R_9 = -16.390$ | | | |
| | $d_9 = 1.3$ | $N_5 = 1.80518$ | $\nu_5 = 25.5$ |
| $R_{10} = 24.147$ | | | |
| | $d_{10}$ VARIABLE | | |
| $R_{11} = 32.024$ | | | |
| | $d_{11} = 3.97$ | $N_6 = 1.64769$ | $\nu_6 = 33.8$ |
| $R_{12} = -25.334$ | | | |
| | $d_{12}$ VARIABLE | | |
| $R_{13} = -28.062$ | | | |
| | $d_{13} = 2.45$ | $N_7 = 1.72342$ | $\nu_7 = 38.0$ |
| $R_{14} = -21.574$ | | | |
| | $d_{14} = 8.81$ | | |
| $R_{15} = -15.846$ | | | |

TABLE II-continued

| f = 36.00~68.00 mm F No. = 1:2.88°~1:5.26° ω = 62.0°~35.30° | | | |
|---|---|---|---|
| $R_{16} = \infty$ | $d_{15} = 1.5$ | $N_8 = 1.6935$ | $\nu_8 = 53.3$ |

The variable distances $d_4$, $d_{10}$ and $d_{12}$ indicated in Table II are given for the specific focal lengths f in the following table wherein Bf represents the back focal distance for the specific focal length f.

Variable Distance

| f | $d_4$ | $d_{10}$ | $d_{12}$ | Bf |
|---|---|---|---|---|
| 36.00 mm | 5.51 mm | 1.30 mm | 11.41 mm | 7.15 mm |
| 50.00 | 4.67 | 2.14 | 5.17 | 20.62 |
| 68.00 | 3.80 | 3.01 | 1.00 | 37.52 |

Embodiment III

Figure 6:
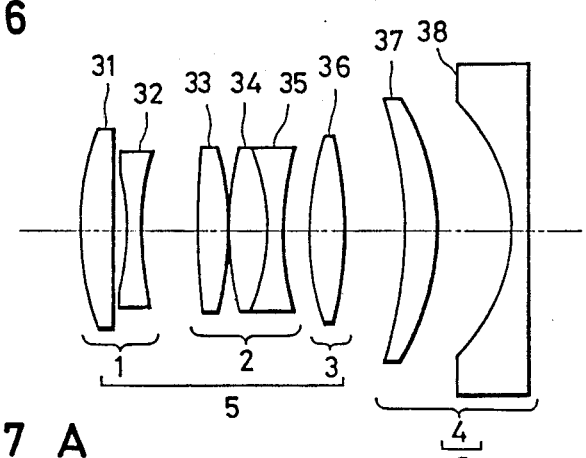
FIG. 6 is a view similar to FIG. 2 but of a third embodiment.
Figure 7A:
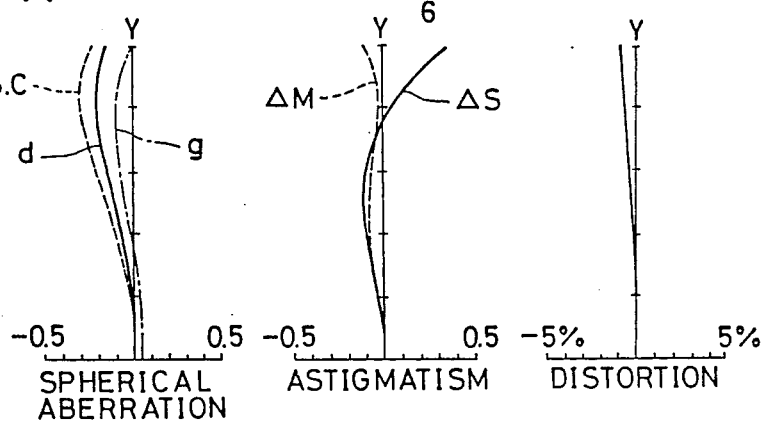
FIGS. 7A, 7B and 7C are views similar to FIGS. 3A–3C but pertaining to FIG. 6.
Figure 7B:
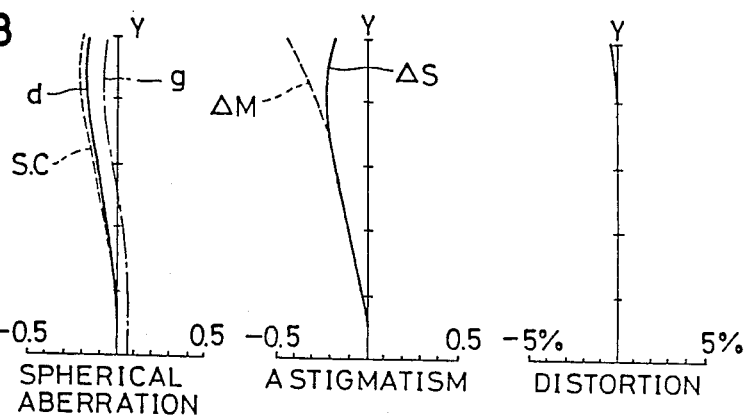
Figure 7C:
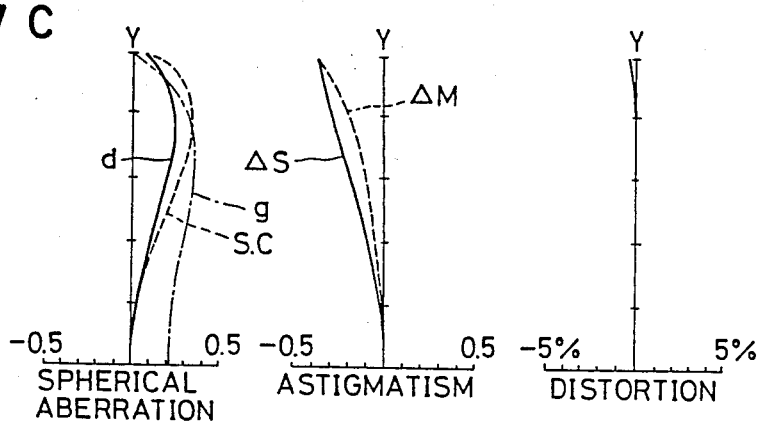

In the third embodiment of the present invention shown in FIG. 6 and defined in Table III, the zoom lens system comprises eight lens components 31 to 38 in much the same way as in the first and second embodiments, but is different in that the second lens group 2 includes a cemented lens comprising the lens components 34 and 35. Consequently, the zoom lens system has lens surfaces of a number less by one than the first and second embodiments. It will also be apparent that the lens movements caused by zooming and focusing operations are the same as in the first and second embodiments. In this third embodiment, the zoom lens system varies in focal length f between 36.00 and 68.00 mm, the aperture ratio or F No. between 1:2.88 at the wide-angle photographic extremity and 1:5.44 at the telephotographic extremity, and the angle of view ω between 62.0° at the wide-angle photography extremity and 35.30° at the telephotographic extremity.

TABLE III

| f = 36.00~68.00 mm F No. = 1:2.88°~1:5.26° ω = 35.28°~61.98° | | | |
|---|---|---|---|
| $R_1 = 23.810$ mm | | | |
| | $d_1 = 3.00$ mm | $N_1 = 1.62041$ | $\nu_1 = 60.7$ |
| $R_2 = -2284.337$ | | | |
| | $d_2 = 1.21$ | | |
| $R_3 = -25.044$ | | | |
| | $d_3 = 1.3$ | $N_2 = 1.713$ | $\nu_2 = 53.9$ |
| $R_4 = 30.246$ | | | |
| | $d_4$ VARIABLE | | |
| $R_5 = 51.089$ | | | |
| | $d_5 = 3.03$ | $N_3 = 1.71736$ | $\nu_3 = 29.5$ |
| $R_6 = -23.059$ | | | |
| | $d_6 = 0.1$ | | |
| $R_7 = 42.663$ | | | |
| | $d_7 = 3.39$ | $N_4 = 1.5168$ | $\nu_4 = 64.2$ |
| $R_8 = -16.470$ | | | |
| | $d_8 = 1.3$ | $N_5 = 1.80518$ | $\nu_5 = 25.5$ |
| $R_9 = 28.516$ | | | |
| | $d_9$ VARIABLE | | |
| $R_{10} = 32.458$ | | | |
| | $d_{10} = 3.32$ | $N_6 = 1.66755$ | $\nu_6 = 41.9$ |
| $R_{11} = -32.107$ | | | |
| | $d_{11}$ VARIABLE | | |
| $R_{12} = -32.530$ | | | |
| | $d_{12} = 2.69$ | $N_7 = 1.80518$ | $\nu_7 = 25.5$ |
| $R_{13} = -21.887$ | | | |
| | $d_{13} = 6.45$ | | |
| $R_{14} = -16.417$ | | | |
| | $d_{14} = 1.5$ | $N_8 = 1.7725$ | $\nu_8 = 49.6$ |
| $R_{15} = \infty$ | | | |

The variable distances $d_4$, $d_9$ and $d_{11}$ indicated in Table III are given for the specific focal lengths in the following table wherein Bf again represents the back focal distance for the specific focal length f.

Variable Distance

| f | $d_4$ | $d_9$ | $d_{11}$ | Bf |
|---|---|---|---|---|
| 36.00 mm | 6.02 mm | 1.30 mm | 11.12 mm | 8.13 mm |
| 50.00 | 4.96 | 2.35 | 5.27 | 21.99 |
| 68.00 | 3.90 | 3.42 | 1.00 | 39.24 |

Embodiment IV

Figure 8:
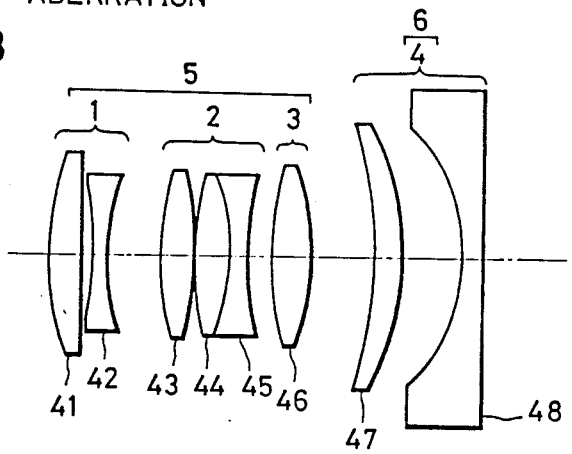
FIG. 8 is a view similar to FIG. 2 but showing a fourth embodiment.
Figure 9:
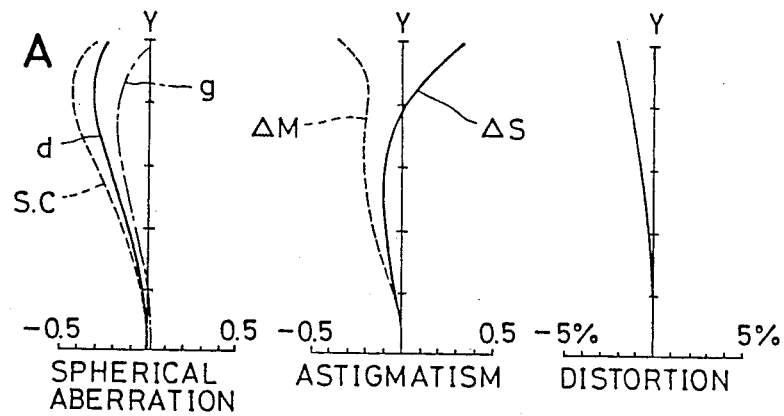
FIGS. 9A, 9B and 9C are views similar to FIGS. 3A–3C but pertaining to FIG. 8.
Figure 9:
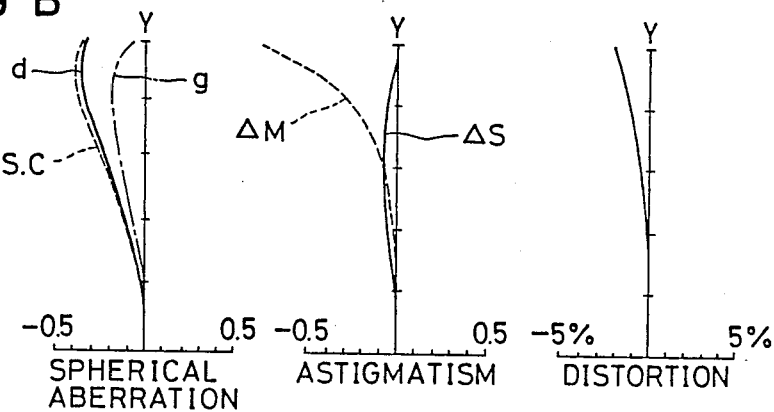
Figure 9:
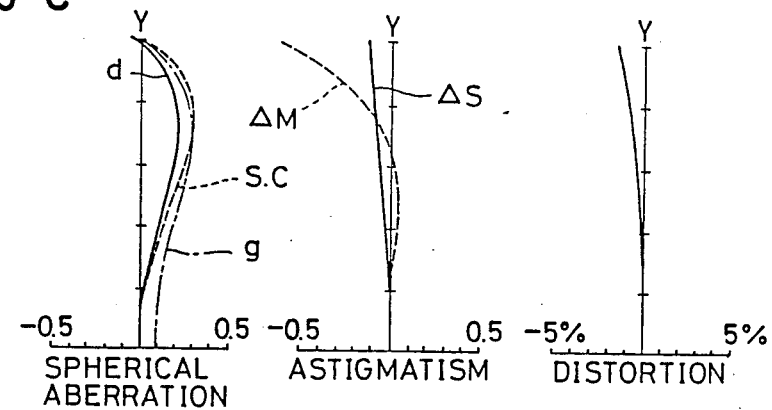

In the fourth embodiment of the present invention shown in FIG. 8 and defined in Table IV, the zoom lens system comprises eight lens components 41 to 48 arranged in the same way as in the third embodiment. The second lens group 2 also includes a cemented lens comprising the lens components 44 and 45, and so has lens surfaces of the same number as the third embodiment. It will also be apparent that the lens movements caused by zooming and focusing operations are the same as in the first to third embodiments.

The zoom lens system of this fourth embodiment varies the focal length f between 36.00 and 68.00 mm, the aperture ratio or F No. between 1:3.18 at the wide-angle photographic extremity and 1:6.0 at the telephotographic extremity, and the angle of view ω between 62.0° at the wide-angle photographic extremity and 35.30° at the telephotographic extremity.

TABLE IV

| f = 36.00~68.00 mm F No. = 1:3.18~1:6.0 ω = 62.0°~35.30° | | | |
|---|---|---|---|
| $R_1 = 23.576$ mm | | | |
| | $d_1 = 3.02$ mm | $N_1 = 1.62041$ | $\nu_1 = 60.7$ |
| $R_2 = \infty$ | | | |
| | $d_2 = 1.06$ | | |
| $R_3 = -26.855$ | | | |
| | $d_3 = 1.3$ | $N_2 = 1.76343$ | $\nu_2 = 49.3$ |
| $R_4 = 21.584$ | | | |
| | $d_4$ VARIABLE | | |
| $R_5 = 31.714$ | | | |
| | $d_5 = 2.98$ | $N_3 = 1.80518$ | $\nu_3 = 25.5$ |
| $R_6 = -28.819$ | | | |
| | $d_6 = 0.1$ | | |
| $R_7 = 42.035$ | | | |
| | $d_7 = 3.25$ | $N_4 = 1.507$ | $\nu_4 = 60.0$ |
| $R_8 = -15.715$ | | | |
| | $d_8 = 1.3$ | $N_5 = 1.80518$ | $\nu_5 = 25.5$ |
| $R_9 = 21.544$ | | | |
| | $d_9$ VARIABLE | | |
| $R_{10} = 29.905$ | | | |
| | $d_{10} = 3.72$ | $N_6 = 1.65722$ | $\nu_6 = 57.3$ |
| $R_{11} = -22.120$ | | | |
| | $d_{11}$ VARIABLE | | |
| $R_{12} = -40.694$ | | | |
| | $d_{12} = 2.76$ | $N_7 = 1.80518$ | $\nu_7 = 25.5$ |
| $R_{13} = -23.116$ | | | |
| | $d_{13} = 5.36$ | | |
| $R_{14} = -15.819$ | | | |
| | $d_{14} = 1.5$ | $N_8 = 1.7725$ | $\nu_8 = 49.6$ |
| $R_{15} = \infty$ | | | |

The variable distances $d_4$, $d_9$ and $d_{11}$ indicated in Table IV are given for the specific focal lengths f in the following table wherein Bf represents the back focal distance for the specific focal length f.

Variable Distance

| f | $d_4$ | $d_9$ | $d_{11}$ | Bf |
|---|---|---|---|---|
| 36.00 mm | 5.77 mm | 1.30 mm | 11.71 mm | 10.98 mm |
| 50.00 | 4.96 | 2.11 | 5.40 | 26.57 |

-continued

| f | $d_4$ | $d_9$ | $d_{11}$ | Bf |
|---|---|---|---|---|
| 68.00 | 4.13 | 2.93 | 1.20 | 46.11 |

Although the present invention has been fully described by way of the preferred embodiments thereof with reference to the accompanying drawings, various changes and modifications will be apparent to those skilled in the art. Therefore, unless otherwise such changes and modifications depart from the true scope of the present invention, they should be construed as included therein.

What is claimed is:

1. A zoom lens system adjustable for wide-angle photography and telephotography by varying the focal length thereof, said zoom lens system comprising, in order from the object side:

front lens means including, in order from the object side, first lens means having a negative refraction power, and second and third lens means each having a positive refraction power; and rear lens means including a fourth lens means having a negative refraction power;

said front and rear lens means being axially movable relative to each other to decrease the distance therebetween and said second lens means being movable toward said first lens means to decrease the distance therebetween and to increase the distance between said second and third lens means, thereby to lengthen said focal length so as to adjust said zoom lens system for telephotography; and said front and rear lens means being axially movable relative to each other to increase said distance therebetween and said second lens means being movable toward said third lens means to decrease the distance therebetween and to increase the distance between said first and second lens means, thereby to shorten said focal length so as to adjust said zoom lens system for wide-angle photography.

2. A zoom lens system as defined in claim 1, wherein said front lens means remains constant in overall length at all values of said focal length.

3. A zoom lens system as defined in claim 1, wherein said first to fourth lens means satisfy the following conditions:

$$|\phi_1| < |\phi_4|$$

$$|\phi_2| < |\phi_3|$$

wherein $\phi$ represents the refractive power of the individual lens groups and the subscript numerals correspond to the consecutive numerals of said first through fourth lens means from the object side.

4. A zoom lens system as defined in claim 1, wherein said first lens means comprises, in order from the object side, a first lens component having a positive refraction power and a second lens component having a negative refraction power, said first lens component being movable for focusing.

5. A zoom lens system as defined in claim 1, having the following numerical data:

| f = 36.01~68.02 mm  F No. = 1:2.88~1:5.26  ω = 35.28°~61.98° | | | |
|---|---|---|---|
| $R_1 = 23.113$ mm | | | |
| | $d_1 = 2.23$ mm | $N_1 = 1.68893$ | $\nu_1 = 31.2$ |
| $R_2 = 58.866$ | | | |
| | $d_2 = 1.41$ | | |
| $R_3 = -24.831$ | | | |
| | $d_3 = 1.30$ | $N_2 = 1.7725$ | $\nu_2 = 49.6$ |
| $R_4 = 50.218$ | | | |
| | $d_4$ VARIABLE | | |
| $R_5 = 69.328$ | | | |
| | $d_5 = 3.33$ | $N_3 = 1.5168$ | $\nu_3 = 64.2$ |
| $R_6 = -19.361$ | | | |
| | $d_6 = 0.10$ | | |
| $R_7 = 27.377$ | | | |
| | $d_7 = 3.52$ | $N_4 = 1.5168$ | $\nu_4 = 64.2$ |
| $R_8 = -23.292$ | | | |
| | $d_8 = 0.53$ | | |
| $R_9 = -20.567$ | | | |
| | $d_9 = 1.30$ | $N_5 = 1.80518$ | $\nu_5 = 25.5$ |
| $R_{10} = 42.058$ | | | |
| | $d_{10}$ VARIABLE | | |
| $R_{11} = 48.902$ | | | |
| | $d_{11} = 2.79$ | $N_6 = 1.80518$ | $\nu_6 = 25.2$ |
| $R_{12} = -51.243$ | | | |
| | $d_{12}$ VARIABLE | | |
| $R_{13} = -37.803$ | | | |
| | $d_{13} = 2.90$ | $N_7 = 1.72342$ | $\nu_7 = 38.0$ |
| $R_{14} = -22.682$ | | | |
| | $d_{14} = 7.97$ | | |
| $R_{15} = -16.009$ | | | |
| | $d_{15} = 1.50$ | $N_8 = 1.6935$ | $\nu_8 = 53.3$ |
| $R_{16} = -629.690$ | | | | wherein the reference symbols R, D, N and $\nu$ respectively represent the radii of curvature of the lens surfaces, the axial thicknesses and distances, the refractive indices for the spectral d-line, and the Abbe numbers of the glasses, which are all expressed with a subscript numbered consecutively from the object side.

6. A zoom lens system as defined in claim 1, having the following numerical data:

| f = 36.00~68.00 mm  F No. = 1:2.88°~1:5.26°  ω = 62.0°~35.30° | | | |
|---|---|---|---|
| $R_1 = 21.444$ mm | | | |
| | $d_1 = 2.57$ mm | $N_1 = 1.62004$ | $\nu_1 = 36.3$ |
| $R_2 = -1320.780$ | | | |
| | $d_2 = 0.67$ | | |
| $R_3 = -30.138$ | | | |
| | $d_3 = 1.3$ | $N_2 = 1.7725$ | $\nu_2 = 49.6$ |
| $R_4 = 32.632$ | | | |
| | $d_4$ VARIABLE | | |
| $R_5 = 32.280$ | | | |
| | $d_5 = 3.21$ | $N_3 = 1.58913$ | $\nu_3 = 61.3$ |
| $R_6 = -27.085$ | | | |
| | $d_6 = 0.1$ | | |
| $R_7 = 41.929$ | | | |
| | $d_7 = 3.44$ | $N_4 = 1.62004$ | $\nu_4 = 36.4$ |
| $R_8 = -17.057$ | | | |
| | $d_8 = 0.19$ | | |
| $R_9 = -16.390$ | | | |
| | $d_9 = 1.3$ | $N_5 = 1.80518$ | $\nu_5 = 25.5$ |
| $R_{10} = 24.147$ | | | |
| | $d_{10}$ VARIABLE | | |
| $R_{11} = 32.024$ | | | |
| | $d_{11} = 3.97$ | $N_6 = 1.64769$ | $\nu_6 = 33.8$ |
| $R_{12} = -25.334$ | | | |
| | $d_{12}$ VARIABLE | | |
| $R_{13} = -28.062$ | | | |
| | $d_{13} = 2.45$ | $N_7 = 1.72342$ | $\nu_7 = 38.0$ |
| $R_{14} = -21.574$ | | | |
| | $d_{14} = 8.81$ | | |
| $R_{15} = -15.846$ | | | |
| | $d_{15} = 1.5$ | $N_8 = 1.6935$ | $\nu_8 = 53.3$ |
| $R_{16} = \infty$ | | | | wherein the reference symbols R, d, N and $\nu$ respectively represent the radii of curvature of the lens surfaces, the axial thicknesses and distances, the refractive indices for the spectral d-line, and the Abbe numbers of the glasses, which are all expressed with a subscript numbered consecutively from the object side.

7. A zoom lens system as defined in claim 1, having the following numerical data:

| $f = 36.00 \sim 68.00$ mm  F No. $= 1:2.88° \sim 1:5.26°$  $\omega = 35.28° \sim 61.98°$ | | | |
|---|---|---|---|
| $R_1 = 23.810$ mm | | | |
| | $d_1 = 3.00$ mm | $N_1 = 1.62041$ | $\nu_1 = 60.7$ |
| $R_2 = -2284.337$ | | | |
| | $d_2 = 1.21$ | | |
| $R_3 = -25.044$ | | | |
| | $d_3 = 1.3$ | $N_2 = 1.713$ | $\nu_2 = 53.9$ |
| $R_4 = 30.246$ | | | |
| | $d_4$ VARIABLE | | |
| $R_5 = 51.089$ | | | |
| | $d_5 = 3.03$ | $N_3 = 1.71736$ | $\nu_3 = 29.5$ |
| $R_6 = -23.059$ | | | |
| | $d_6 = 0.1$ | | |
| $R_7 = 42.663$ | | | |
| | $d_7 = 3.39$ | $N_4 = 1.5168$ | $\nu_4 = 64.2$ |
| $R_8 = -16.470$ | | | |
| | $d_8 = 1.3$ | $N_5 = 1.80518$ | $\nu_5 = 25.5$ |
| $R_9 = 28.516$ | | | |
| | $d_9$ VARIABLE | | |
| $R_{10} = 32.458$ | | | |
| | $d_{10} = 3.32$ | $N_6 = 1.66755$ | $\nu_6 = 41.9$ |
| $R_{11} = -32.107$ | | | |
| | $d_{11}$ VARIABLE | | |
| $R_{12} = -32.530$ | | | |
| | $d_{12} = 2.69$ | $N_7 = 1.80518$ | $\nu_7 = 25.5$ |
| $R_{13} = -21.887$ | | | |
| | $d_{13} = 6.45$ | | |
| $R_{14} = -16.417$ | | | |
| | $d_{14} = 1.5$ | $N_8 = 1.7725$ | $\nu_8 = 49.6$ |
| $R_{15} = \infty$ | | | | wherein the reference symbols R, d, N and $\nu$ respectively represent the radii of curvature of the lens surfaces, the axial thicknesses and distances, the refractive indices for the spectral d-line, and the Abbe numbers of the glasses, which are all expressed with a subscript numbered consecutively from the object side.

8. A zoom lens system as defined in claim 1, having the following numerical data:

| $f = 36.00 \sim 68.00$ mm  F No. $= 1:3.18 \sim 1:6.0$  $\omega = 62.0° \sim 35.30°$ | | | |
|---|---|---|---|
| $R_1 = 23.576$ mm | | | |
| | $d_1 = 3.02$ mm | $N_1 = 1.62041$ | $\nu_1 = 60.7$ |
| $R_2 = \infty$ | | | |
| | $d_2 = 1.06$ | | |
| $R_3 = -26.855$ | | | |
| | $d_3 = 1.3$ | $N_2 = 1.76343$ | $\nu_2 = 49.3$ |
| $R_4 = 21.584$ | | | |
| | $d_4$ VARIABLE | | |
| $R_5 = 31.714$ | | | |
| | $d_5 = 2.98$ | $N_3 = 1.80518$ | $\nu_3 = 25.5$ |
| $R_6 = -28.819$ | | | |
| | $d_6 = 0.1$ | | |
| $R_7 = 42.035$ | | | |
| | $d_7 = 3.25$ | $N_4 = 1.507$ | $\nu_4 = 60.0$ |
| $R_8 = -15.715$ | | | |
| | $d_8 = 1.3$ | $N_5 = 1.80518$ | $\nu_5 = 25.5$ |
| $R_9 = 21.544$ | | | |
| | $d_9$ VARIABLE | | |
| $R_{10} = 29.905$ | | | |
| | $d_{10} = 3.72$ | $N_6 = 1.65722$ | $\nu_6 = 57.3$ |
| $R_{11} = -22.120$ | | | |
| | $d_{11}$ VARIABLE | | |
| $R_{12} = -40.694$ | | | |
| | $d_{12} = 2.76$ | $N_7 = 1.80518$ | $\nu_7 = 25.5$ |
| $R_{13} = -23.116$ | | | |
| | $d_{13} = 5.36$ | | |
| $R_{14} = -15.819$ | | | |
| | $d_{14} = 1.5$ | $N_8 = 1.7725$ | $\nu_8 = 49.6$ |
| $R_{15} = \infty$ | | | | wherein the reference symbols R, d, N and $\nu$ respectively represent the radii of curvature of the lens surfaces, the axial thicknesses and distances, the refractive indices for the spectral d-line, and the Abbe numbers of the glasses, which are all expressed with a subscript numbered consecutively from the object side.

* * * * *